(12) United States Patent
Beyda et al.

(10) Patent No.: US 6,172,984 B1
(45) Date of Patent: Jan. 9, 2001

(54) SYSTEM AND METHOD FOR REDUCING THE LATENCY FOR TIME SENSITIVE DATA OVER CSMA/CD NETWORKS

(75) Inventors: William Joseph Beyda, Cupertino; Shmuel Shaffer, Palo Alto, both of CA (US)

(73) Assignee: Siemens Information and Communication Networks, Inc., Boca Raton, FL (US)

( * ) Notice: Under 35 U.S.C. 154(b), the term of this patent shall be extended for 0 days.

(21) Appl. No.: 08/976,196

(22) Filed: Nov. 21, 1997

Related U.S. Application Data

(63) Continuation-in-part of application No. 08/878,522, filed on Jun. 19, 1997, now Pat. No. 5,960,001.

(51) Int. Cl.$^7$ .................................................. H04L 12/413
(52) U.S. Cl. ........................................... 370/448; 370/445
(58) Field of Search .................................... 370/448, 229, 370/230, 231, 235, 359, 360, 373, 384, 402, 404, 405, 406, 410, 412, 413, 419, 426, 428, 445, 447, 451, 453, 455, 460, 461, 462, 465

(56) References Cited

U.S. PATENT DOCUMENTS

| | | |
|---|---|---|
| 4,063,220 | 12/1977 | Metcalfe et al. ............... 340/147 LP |
| 4,464,658 | 8/1984 | Thelen .............................. 340/825.5 |
| 4,549,292 | 10/1985 | Isaman et al. ........................ 370/89 |
| 4,598,285 | 7/1986 | Hoshen .............................. 340/825.5 |
| 4,630,264 | 12/1986 | Wah et al. ............................... 370/85 |
| 4,637,014 | 1/1987 | Bell et al. ............................... 370/89 |
| 4,858,232 | 8/1989 | Diaz et al. . |
| 4,965,792 | 10/1990 | Yano .................................... 370/85.2 |
| 5,018,138 | 5/1991 | Twitty et al. ........................ 370/94.1 |
| 5,268,899 | 12/1993 | Brown .................................. 370/85.3 |
| 5,319,641 | 6/1994 | Fridrich et al. ..................... 370/85.3 |
| 5,329,531 | 7/1994 | Diepstraten et al. . |
| 5,353,287 | 10/1994 | Kuddes et al. ...................... 370/85.2 |
| 5,381,413 | 1/1995 | Tobagi et al. ....................... 370/85.6 |
| 5,398,244 | 3/1995 | Mathews et al. ................... 370/85.6 |
| 5,406,559 | 4/1995 | Edem et al. ............................ 370/91 |
| 5,418,784 | 5/1995 | Ramakrishman et al. .......... 370/85.3 |
| 5,422,887 | 6/1995 | Diepstraten et al. ............... 370/85.3 |
| 5,436,903 | 7/1995 | Yang et al. ......................... 370/85.3 |
| 5,440,556 | 8/1995 | Edem et al. . |
| 5,446,735 | 8/1995 | Tobagi et al. ....................... 370/85.3 |
| 5,450,411 | 9/1995 | Heil ..................................... 370/94.2 |
| 5,521,928 | 5/1996 | Worsley et al. ........................ 370/67 |
| 5,526,355 | 6/1996 | Yang et al. ......................... 370/85.3 |
| 5,568,476 | * 10/1996 | Sherer et al. ........................ 370/236 |
| 5,570,355 | 10/1996 | Dail et al. . |
| 5,594,732 | 1/1997 | Bell et al. ............................. 370/401 |
| 5,642,360 | * 6/1997 | Trainin ................................ 370/230 |
| 5,761,430 | 6/1998 | Gross et al. . |
| 5,805,597 | 9/1998 | Edem . |
| 5,878,028 | * 3/1999 | Roy et al. ............................ 370/235 |
| 5,982,779 | * 11/1999 | Krishnakumar et al. ............ 370/447 |
| 5,999,538 | * 12/1999 | Haddock et al. .................... 370/446 |

OTHER PUBLICATIONS

U.S. Patent Application Ser. No. 08/878,522 entitled "System and Method for Guaranteeing Isochronous Flow Control on a CSMA/CD Network", filed Jun. 19, 1997.

\* cited by examiner

*Primary Examiner*—Douglas W. Olms
*Assistant Examiner*—Phirin Sam

(57) ABSTRACT

A device (104) transmitting or receiving low priority data may receive or be directed to transfer higher priority data for transmission. If the incoming data is of sufficiently high priority, the device (104) will interrupt transmission of the outgoing data by generating a signal on the bus (102) indicative of a collision. The receiving device (106) will then back-off. To prevent another device (106, 108) from seizing the bus after the back-off, the device (104) immediately (i.e., before expiration of a single slot time), proceeds with the high priority transmission. Once it is finished, the device (104) may resume its earlier lower priority transmission.

16 Claims, 4 Drawing Sheets

SYSTEM AND METHOD FOR REDUCING THE LATENCY FOR TIME SENSITIVE DATA OVER CSMA/CD NETWORKS

CROSS REFERENCE TO RELATED APPLICATIONS

This application is a continuation-in-part of U.S. patent application Ser. No. 08/878,522, titled "System and Method for Guaranteeing Isochronous Flow Control on a CSMA/CD Network," filed Jun. 19, 1997, now U.S. Pat. No. 5,960,001.

BACKGROUND OF THE INVENTION

1. Field of the Invention

This invention relates to a network access protocol known as carrier sense multiple access with collision detection (CSMA/CD) and, more particularly, to a method for allowing isochronous data flow on such a network.

2. Description of the Related Art

The CSMA/CD protocol generally used in Ethernet LANs (local area networks), is defined in ANSI/IEEE standard 802.3, published by the Institute of Electrical and Electronics Engineers (hereinafter the "IEEE 802.3 standard"). Under the CSMA/CD rules for access to a network bus or cable, any node or station wishing to transmit must first listen to ensure that the channel is clear before beginning to transmit. All nodes on the network have equal priority of access and may begin transmitting as soon as the channel is clear and a required interpacket delay of 9.6 microseconds has elapsed. However, if a first node that has begun transmitting detects a collision with a transmission from another node, the first node continues transmitting for a short time to make sure that all nodes wishing to transmit will detect the collision (it is assumed that, while the attempts to transmit are nearly simultaneous, the first node is actually the first to begin). Collisions are detected by detecting a predetermined signal or voltage level on the bus. Every other node detecting the collision also continues to transmit for a short time. Then each node that has detected a collision terminates transmission of the packet or frame. The nodes involved in the collision then wait for a required interpacket delay of 9.6 microseconds and then select random and therefore usually different delay times, referred to as back-off times, before attempting to transmit their packets again.

The IEEE 802.3 standard defines a collision back-off procedure referred to as "truncated binary exponential back-off." When a transmission attempt has terminated due to a collision, it is retried by the transmitting node after a selected back-off time until either the transmission is successful or a maximum number of attempts have been made and all have been terminated due to collisions. The back-off time is selected by each node is an integral multiple of the "slot time" which is the maximum round trip propagation time for the network, i.e., the time required to propagate a data packet from one end of the network to another. The slot time is defined by the IEEE 802.3 standard as 51.2 microseconds. The number of slot times selected as the back-off time before the nth retransmission is chosen as a randomly distributed integer R in the range: $0 \leq R \leq 2^k$, where k=min (n, 10).

While generally adequate for transmitting packetized burst-type data such as e-mail or word processing documents, a CSMA/CD network according to the IEEE 802.3 protocol makes no provision for traffic priority. Thus, real-time or isochronous (i.e., higher priority) traffic is put at risk of being blocked if a node is currently transmitting lower priority data. High priority isochronous data such as voice or video requires a guaranteed bandwidth and tightly bounded delivery delays. Accordingly, the delay required to complete the transmission of lower priority data can adversely affect the higher priority data.

One approach to providing for isochronous data transmission on a local area network is isochronous Ethernet ("isoEthernet") or IEEE standard 802.9a. IsoEthernet is a hybrid network that combines standard 10 megabit per second Ethernet with 6.144 megabits per second of isochronous bandwidth for a total of 16 megabits per second available to any user. The isochronous portion is further divided into 96 separate 64 kbps ISDN bearer or B channels. While providing backward compatibility and the ability to be introduced piecemeal, isochronous Ethernet requires channels separate from the existing CSMA/CD data path in order to provide for isochronous data flow. This results in a relatively higher and undesirable level of complexity.

Accordingly, it is desirable to provide a system and method for reducing the latency of high priority data on an existing CSMA/CD network path. There is a still further need for providing for interrupting low priority transmission so that a higher priority transmission may occur on the same channel. Finally, there is a need for resuming transmission of the lower priority transmission once the higher priority transmission has been completed.

SUMMARY OF THE INVENTION

These problems in the prior art are overcome in large part by a system and method according to the present invention. A device transmitting or receiving low priority data may receive or be directed to transfer higher priority data for transmission. If the incoming data is of sufficiently high priority, the device will interrupt transmission of the outgoing data by generating a signal on the bus indicative of a collision. The receiving device will then back-off. To prevent another device from seizing the bus after the back-off, the device immediately (i.e., before expiration of a single slot time) proceeds with the high priority transmission. Once it is finished, the device may resume its earlier lower priority transmission.

BRIEF DESCRIPTION OF THE DRAWINGS

A better understanding of the present invention is obtained when the following detailed description is considered in conjunction with the following drawings in which.

DETAILED DESCRIPTION OF THE INVENTION

Figure 1:
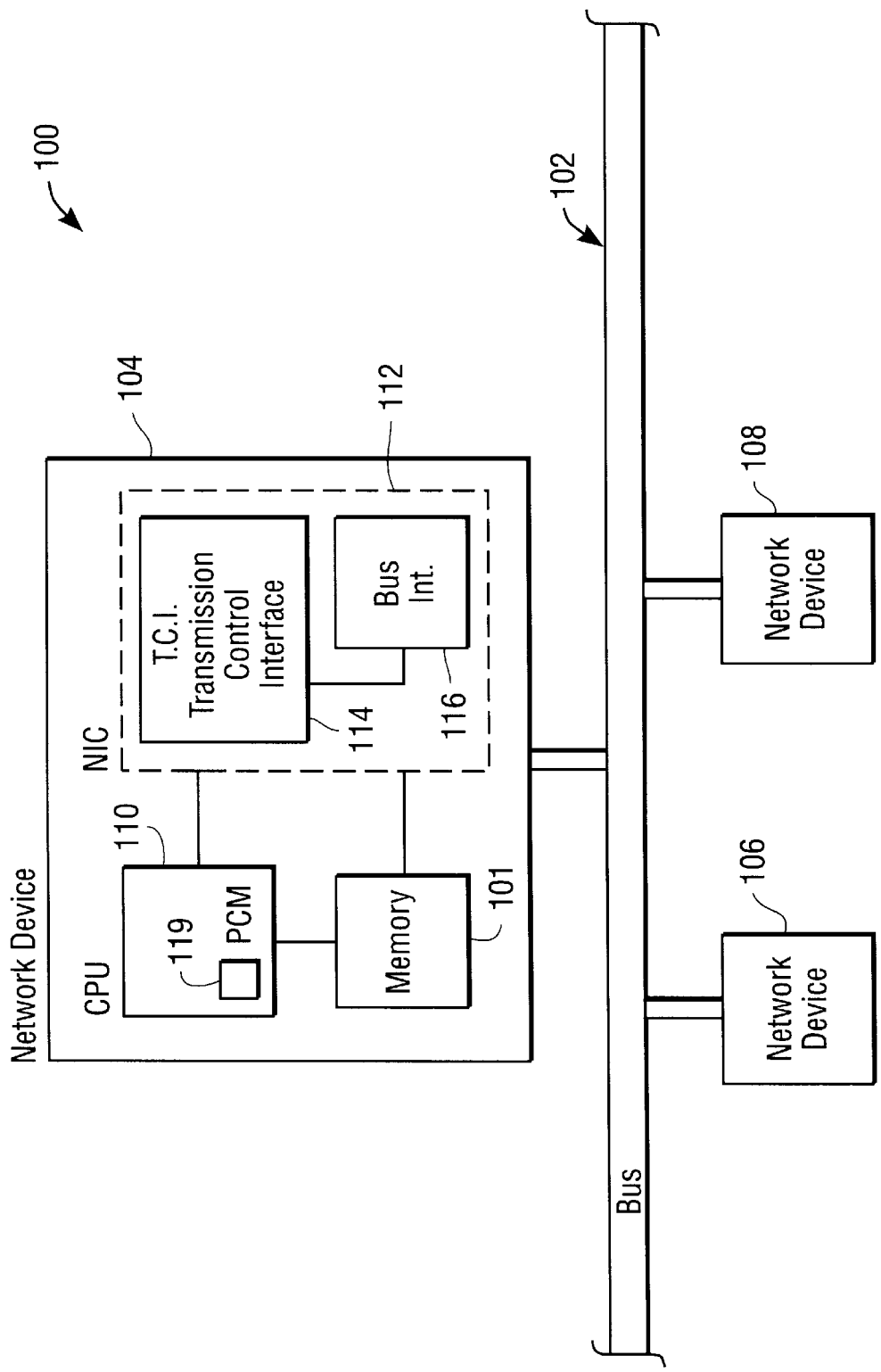
FIG. 1 is a block diagram illustrating a network system according to one embodiment of the present invention.

A network system 100 employing an embodiment of the present invention is illustrated. The network system 100 is configured such that a device transmitting low priority data can be interrupted in favor of higher priority data. The interruption can take the form of a signal being generated on the bus indicative of a collision. The sending device halts transmission. Other devices will detect the collision and back-off. The receiving device reads the interruption by storing the already sent data and waiting for resumption of the transmission. Immediately after the back-off, (i.e., before expiration of a slot time), the sending device places the higher priority data onto the bus to prevent contention.

In particular, the network system 100 includes a plurality of network devices 104, 106, 108 (e.g., data sending devices) coupled to a transmission medium or bus 102. The bus 102 may be, for example, a coaxial cable or 10 base T unshielded twisted pair wiring. The network devices 104, 106, 108 are exemplary of personal computers, printers, servers or other devices.

The invention will be described with respect to exemplary device or sender 104. While each network device 104, 106, 108 in the network 100 may be similarly configured, the present invention is operable if one or more nodes are so configured. The network device 104 includes an exemplary network interface card 112 coupled to a central processing unit 110. The central processing unit 110 is exemplary of a Pentium or Pentium II-type processor in a personal computer. One or more memories 101, such as random access memory or EEPROM, or any combinations thereof, may be coupled to the central processing unit 110. As will be described in greater detail below, the memory 101 may be used to store uncompleted portions of low priority transmissions. The network device 104 may further include a plurality of peripheral devices, such as video cameras, modems and the like, which may have data which is to be transferred to other network devices.

The central processing unit 110 may include a priority control module 119, which may be embodied, for example, in software. As will be discussed in greater detail below, the priority control module 119 may include a plurality of registers for storing transmission requests according to priority level (for example, each transmission request may be accompanied by priority message). Alternatively, such information may be stored in the memory 101. The transmissions are completed in order of priority. The priority control module is further configured to assert a "collision" signal responsive to high priority data.

The network interface card 112 is commonly known and includes a transmission control interface 114 configured to detect collisions on the bus, as will be explained in greater detail below. The transmission control interface 114 in turn is coupled by a bus interface 116 to bus 102. The bus interface 116 includes commonly known I/O drivers and circuitry to monitor activity on bus 102. The transmission control interface 117 may be a controller for a CSMA/CD network protocol.

Figure 2:
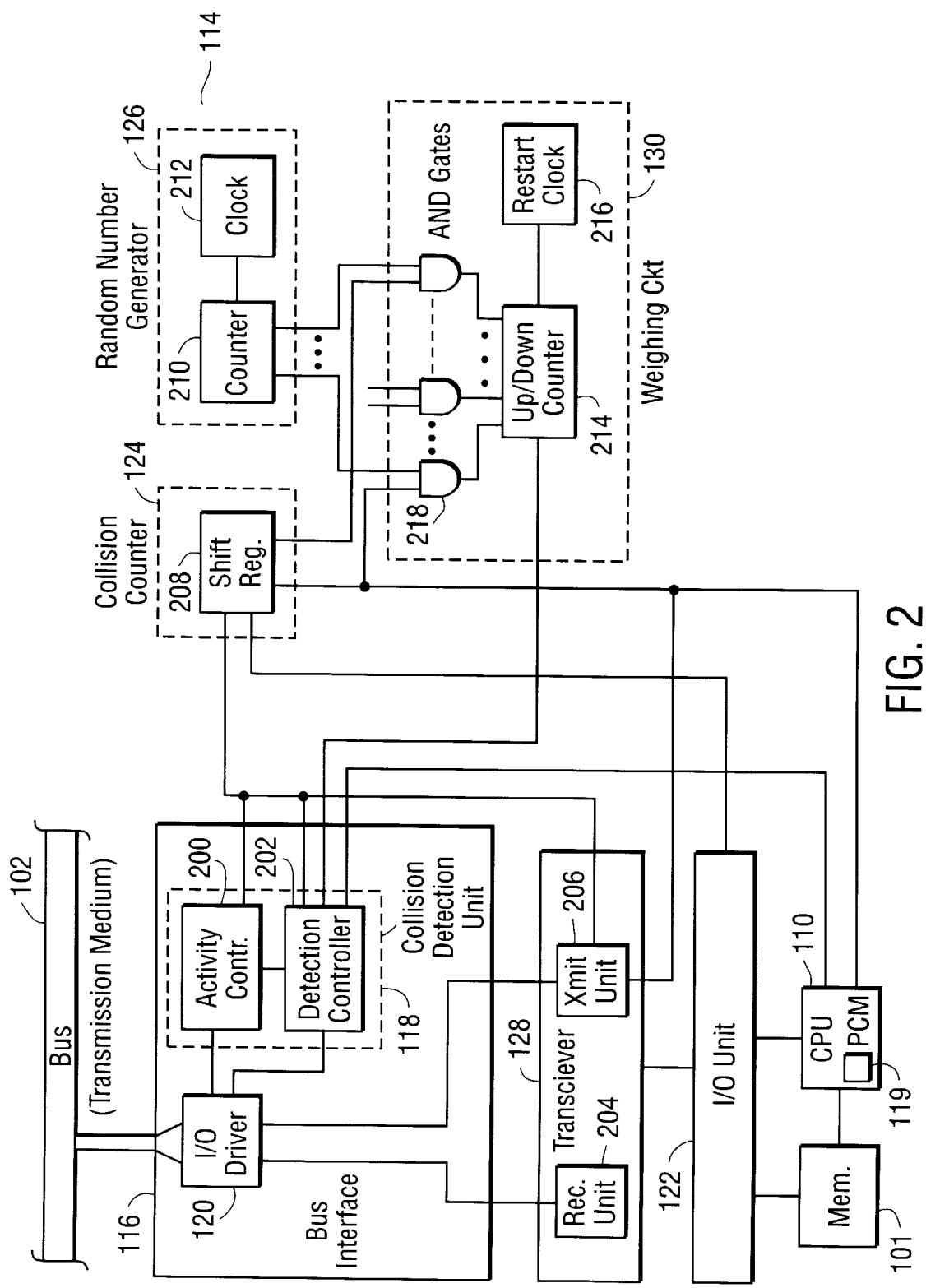
FIG. 2 is a more detailed block diagram illustrating a network device in the network system of FIG. 1.

FIG. 2 illustrates in greater detail the components of the network interface card 112. It is noted that, while illustrated as discrete hardware, the bus interface 116 and the transmission control interface 114 may be embodied in one or more digital signal processors (DSPs) or central processors. Thus, FIG. 1 and FIG. 2 are exemplary only.

As illustrated in FIG. 2, the bus interface 116 includes an I/O driver unit 120 coupled to a commonly known collision detection unit 118. The I/O driver unit 120 drives data to and receives data from the bus 102. The collision detection unit 118 includes an activity controller 200 coupled to a detection controller 202. The activity controller 200 is used to identify data on the bus and control the CSMA/CD protocol system based thereon. If a collision is detected during a transmission attempt, the activity controller 200 provides an output to the control unit 202.

The detection control unit 202 then suspends transmission along the transmission medium 108 and provides a control signal to the collision counter 124. The collision counter 124 includes, for example, a shift register 208. The shift register 208 may be configured to shift every time a collision is detected.

The shift control signal is also provided to a transmission controller 206 in the transceiver 128. The transceiver 128 includes a receive unit 204 in addition to the transmission unit 206.

Data to be sent on the bus are received, for example, by the CPU 110 from the memory 101 through the I/O unit 122 and on to the transceiver 128. When data messages are received, control information indicative of data type, priority, and destination are also received. A priority level corresponding to the transmitted data is stored, for example, in a register (not shown) of the priority control module 119 or in the memory 101. The data messages are then provided to the I/O drivers 120 and out onto the transmission medium or bus 108.

When the detection control unit 202 has provided a shift control signal indicative of a collision to the shift register 208, the shift register 208 provides outputs to a series of AND gates 218. The other inputs to the AND gates 218 are derived from the random number generator 126. More particularly, the random number generator 126 includes a counter 210 and a clock 212. The clock 212 is a faster clock than the system clock. The counter 210 runs as a continually running clock counter. The AND gates 218 form a portion of the weighing circuit 130. The weighing circuit 130 further includes an up/down counter 214 coupled to a restart clock 216. As noted above, the shift register 208 is clocked each time a collision occurs and the serial input thereof is, in turn, provided to count up the number of collisions occurring during those times when a frame is ready for transmission.

The outputs of the AND Gates 218 are connected to the inputs of the up/down counter 214, which is clocked by the restart clock 216. The up/down counter 214 is loaded by the collision detection signal to begin a down count when a collision is detected. When the count reaches zero, a signal is sent to the transmission control 206 to cause retransmission of the data frame. According to the present invention, data transmitted under the control of the CPU 110 may be assigned one or more priority levels. For example, isochronous data may be assigned a higher priority than non-isochronous data. The CPU 110 may determine the priority of data, by any known means, such as receiving a control packet from the requesting device or software module.

For example, if the network device 104 is transmitting data having a first priority, the CPU 110 may receive data (or an instruction to transmit data) having a higher priority. Both the high and low priority data may come from the memory 101 or from another device via another link (not shown), for example, a Universal Serial Bus (USB) link. When the CPU 110 receives or processes a command to transmit new data, the priority control module 119 reads the priority level of the incoming data and compares it with the priority level of the currently transmitted data. If the incoming data has a higher priority, the priority control module 119 instructs the CPU 110 to interrupt the current transmission. The interruption is effected by the CPU 110 providing a signal to the I/O unit 122 by way of the transceiver 128, out the bus interface 116 and onto the bus 102. The collision detection unit 118 detects the signal as a collision. In addition, the receiving device's collision detection unit (not shown) detects the collision and backs off; alternatively, the receiving device treats the collision as a line error and prepares for recovering the remaining data. Already received packets or frames of data are stored in anticipation of receiving the remaining packets or frames of the transmission. Back at the sending device, the interrupted packet or frame may be stored in the memory 101. An address may be stored in a register (not shown) in the priority control module 119.

As discussed above, ordinarily, collision causes activation of the collision counter 124, random number generator 126 and weighing circuit 130. However, in this case, the CPU 110, which triggered the "dummy" collision will either ignore or disable the back-off circuitry, and will instead transfer the higher priority data onto the bus 102 prior to expiration of a minimum period, such as a single slot time. The signal for the CPU 110 to do this may be a signal from the I/O driver 120 to the receive unit 204. As discussed above, this may include transferring data from the memory 101 (or from another external interface, such as a USB), to the I/O unit 122, and out the transceiver 128 and the bus interface 116.

Once the higher priority data have been transmitted, the CPU 110 again may transmit a collision interrupt signal to clear the bus 102. The CPU 110 then retrieves the address of the interrupted frame from a register (not shown) in the priority control module 119 and uses the retrieved address to access the interrupted data. The transmission resumes and is concluded in the standard fashion.

Figure 3:
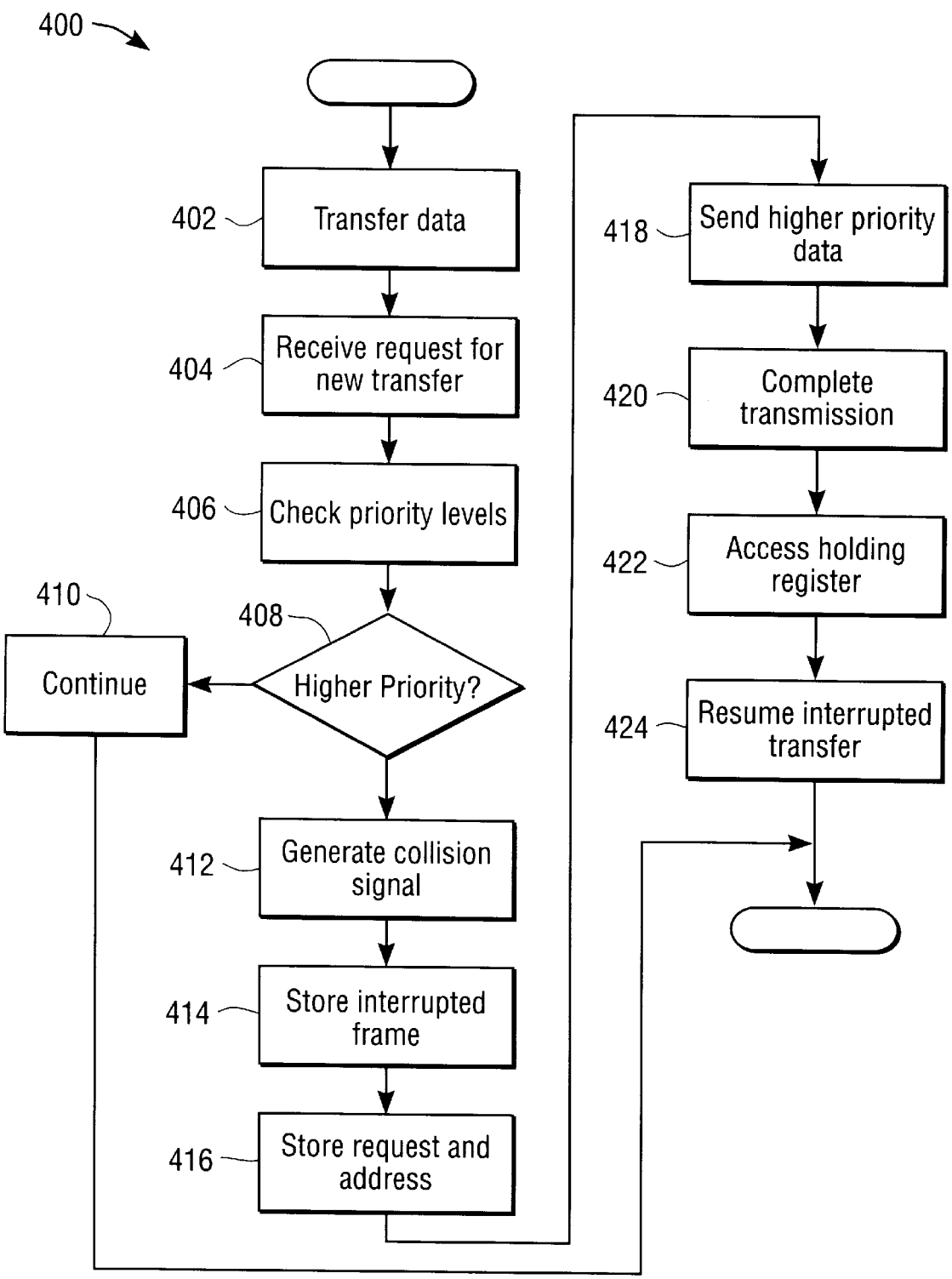
FIG. 3 is a flowchart illustrating a method according to one embodiment of the present invention.

It is noted that, in one embodiment, the held or interrupted low priority data need not be transmitted immediately after the interrupting data have been transmitted. Instead, other higher priority data may be transmitted first. For example, requests for transmission may be received by the CPU 110 and stored in a register queue (not shown) in the priority control module 119. The data transfer requests are completed in the order of priority. This includes requests for resumption of interrupted transmissions. Only if the interrupted transmission is the next-highest priority, will the interrupted transmission be resumed. Thus, after the interrupting transmission has been completed, the CPU 110 will access the priority register for the next transmission and transmit the next highest request. Interrupted data may be assigned a higher priority. Turning now to FIG. 3, a flowchart 400 illustrating operation of a method according to an embodiment of the present invention is shown. In a step 402, the network device 104 transmits data onto the bus 102. As discussed above, transmission of data may include the CPU 110 transferring data from a memory 101 or from another device coupled via an external interface such as via a universal serial bus interface. The data are transmitted across the I/O unit 122 through the transceiver 128 and delivered to the bus interface 116 whereupon they are transferred onto the bus 102. A priority level corresponding to the transfer is stored in the memory 101 or an on-board register by the priority control module 119.

During the transmission of the data, the network device 104 may be required or receive a request to transfer additional data in a step 404.

Again, the additional data may be received from the memory 101 or across another external interface. The transfer request may include data type, priority and destination control information. In a step 406, the CPU 110, or more particularly, the priority control module 119 will read the transfer request and determine whether or not the received request is of higher priority than the currently executing transmission. As discussed above, this may include the priority control module 119 comparing the priority level of the received request with the current transmission's stored priority level in a step 408. If the incoming request is not of a higher priority than the already executing request, then in a step 410, the current transmission continues to its conclusion. If, however, in step 408 the incoming request is identified as having a higher priority level than the currently executing request, the priority control module 119 will generate a collision signal (e.g., a predetermined voltage) on the bus 102 in a step 412. The receiving device detects the signal as indicative of a line fault and executes procedures to save the already sent data and to await retransmission of the remaining data. Other devices treat the signal as a collision and back-off. In a step 414, the sending device 104 stores the interrupted packet or frame in the memory 101. The address of the interrupted frame is stored, for example, in the priority request queue register or registers of the priority control unit 119. In a step 418, the CPU 110 will cause the higher priority data corresponding to the interrupting request to be transferred to the bus 102 and to a receiving device. In a step 420, the data transmission of the interrupting higher priority data will be completed.

At this point, the CPU 110 may access the register in the priority control module 119 or the memory location in memory 101 which contains the address of the interrupted frame in a step 422. The address stored therein is used to access the memory for the interrupted frame, which is sent in a step 424. It is noted that resumption of the interrupted transmission may include assertion of a collision signal by the priority control module 119, as above, in order to effectively seize the bus 102 and cause other devices to back off. Alternatively, the resumption of the interrupted transmission may proceed according to the ordinary rules of the CSMA/CD protocol.

Figure 4:
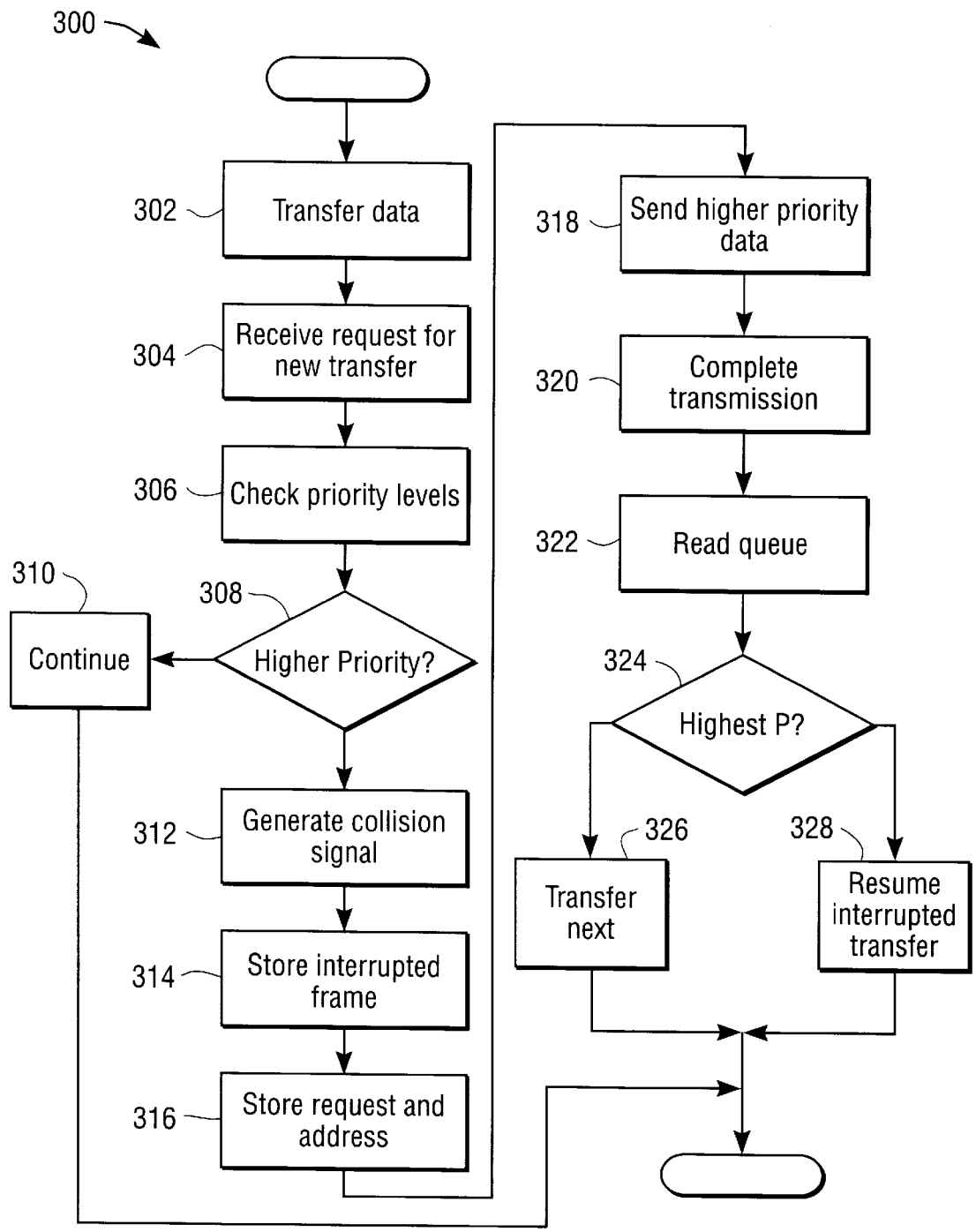
FIG. 4 is a flowchart illustrating a method according to one embodiment of the present invention.

Turning now to FIG. 4, a flowchart 300 illustrating operation of a method according to another embodiment of the present invention is shown. In a step 302, the network device 104 transmits data onto the bus 102. As discussed above, transmission of data may include the CPU 110 transferring data from a memory 101 or from another device coupled via an external interface such as via a universal serial bus interface. The data are transmitted across the I/O unit 122 through the transceiver 128 and delivered to the bus interface 116 whereupon they are transferred onto the bus 102. A priority level corresponding to the transfer is stored in the memory 101 or an on-board register by the priority control module 119.

During the transmission of the data, the network device 104 may be required or receive a request to transfer additional data in a step 304. Again, the additional data may be received from the memory 101 or across another external interface. The transfer request may include data type, priority and destination control information. In a step 306, the CPU 110 or the priority control module 119 will read the transfer request and determine whether or not the received request is of higher priority than the currently executing transmission.

As discussed above, this may include the priority control module 119 comparing the priority level of the received request with the current transmission's stored priority level in a step 308. If the incoming request is not of a higher priority than the already executing request, then in a step 310, the current transmission continues to its conclusion. If, however, in step 308 the incoming request is identified as having a higher priority level than the currently executing request, the priority control module 119 will generate a collision signal, such as a predetermined voltage, on the bus 102 in a step 312. The receiving device detects the signal as indicative of a line fault and executes procedures to save the already sent data and to await retransmission of the remaining data. Other devices treat the signal as a collision and back-off. In a step 314, the sending device 104 stores the interrupted frame or packet in the memory 101. The address of the interrupted frame is stored, for example, in the priority request queue register or registers of the priority control unit 119. In a step 318, the CPU 110 will cause the higher priority data corresponding to the interrupting request to be transferred to the bus 102 and to a receiving device. In a step 320, the data transmission of the interrupting higher priority data will be completed.

At this point, the CPU 110 may access the priority queue in the priority control module 119 in a step 322. If the interrupted transmission is the highest priority data in the queue as determined in a step 324, then the interrupted transmission will be completed in a step 328. If, however, in step 324 the interrupted data was determined to not be the highest priority data in the queue, then the next highest priority data in the queue will be transmitted in a step 326. Again, resumption of the interrupted transmission may include assertion of a collision signal by the priority control module 119, as above, in order to effectively seize the bus 102 and cause other devices to back off. Alternatively, the resumption of the interrupted transmission may proceed according to the ordinary rules of the CSMA/CD protocol.

The invention described in the above detailed description is not intended to be limited to the specific form set forth herein but on the contrary, it is intended to cover such alternatives, modifications and equivalents as can reasonably be included within the spirit and scope of the appended claims.

What is claimed is:

1. A system for transmitting data having a plurality of priorities, comprising:
   means associated with a first device for transferring first data having a first priority onto a bus, said transferring means including means for contending for bus access; and
   means associated with said first device for interrupting a transfer of said first data in favor of a transfer of second data having a second priority, said interrupting means including means for asserting a signal on said bus receivable by said contending means as indicative of a contention on said bus and means for effecting said second transfer prior to expiration of a slot time triggered by said signal asserting means, said time slot comprising a minimum standard backoff period.

2. A system according to claim 1, said contending means comprising means for implementing a CSMA/CD protocol.

3. A system according to claim 1, said transferring means including means for storing priority information corresponding to said data.

4. A system according to claim 3, said interrupting means including means for comparing said first priority level to said second priority level.

5. A system according to claim 1, including means for storing an interrupted frame of said first data responsive to said interrupting means.

6. A system according to claim 5, further including means for resuming said transfer of said first data.

7. A system according to claim 6, said resuming means including means for delaying a resumption until third data having a higher priority are transferred.

8. A method for transmitting data having a plurality of priorities, comprising:
   a first device contending for bus access and transferring first data having a first priority onto a bus; and
   said first device interrupting a transfer of said first data in favor of a transfer of second data having a second priority, said interrupting including asserting a signal on said bus receivable indicative of a contention on said bus and including effecting said second transfer prior to expiration of a slot time triggered by said asserting, said time slot comprising a minimum standard backoff period.

9. A method according to claim 8, said contending comprising implementing a CSMA/CD protocol.

10. A method according to claim 8, said transferring including storing priority information corresponding to said data.

11. A method according to claim 10, said interrupting including comparing said first priority level to said second priority level.

12. A method according to claim 8, including storing an interrupted frame of said first data responsive to said interrupting.

13. A method according to claim 12, further including resuming said transfer of said first data.

14. A method according to claim 13, said resuming including delaying a resumption until third data having a higher priority are transferred.

15. A network device, comprising:
   a priority control module adapted to define a priority of transfers on a network bus; and
   a transmission control interface operably coupled to said bus and adapted to interrupt a transfer on said network bus of a first priority in favor of a transfer of a second priority, said transmission control interface adapted to assert a signal on said network bus detectable as indicative of a collision on said network bus; and
   wherein said transmission control interface is adapted to effect said second transfer on said network bus prior to expiration of a slot time, said slot time defining a minimum standard backoff time.

16. A network device, comprising:
   a priority control module adapted to define a priority of transfers on a network bus; and
   an I/O unit adapted to assert a signal on said network bus indicative of a collision during a transfer of a first priority; and
   a collision detection unit adapted to detect said signal and interrupt said first transfer in favor of a second transfer of a second priority; and
   a transmission control interface adapted to effect said second transfer on said network bus after said collision is detected and before expiration of a slot time, said slot time defining a minimum standard backoff time.

* * * * *